United States Patent
Cheng et al.

(10) Patent No.: US 7,328,050 B2
(45) Date of Patent: Feb. 5, 2008

(54) MOBILE COMMUNICATION DEVICE

(75) Inventors: Yung-Fa Cheng, Taipei Shien (TW); Hsiang-Lung Kao, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 372 days.

(21) Appl. No.: 11/188,701

(22) Filed: Jul. 26, 2005

(65) Prior Publication Data

US 2006/0160577 A1 Jul. 20, 2006

(30) Foreign Application Priority Data

Jan. 14, 2005 (TW) .............................. 94200795 U

(51) Int. Cl.
*H04B 1/38* (2006.01)
(52) U.S. Cl. .................. 455/575.3; 455/90.3; 455/566; 379/433.13; 379/434
(58) Field of Classification Search ............... 455/90.1, 455/90.2, 90.3, 550.1, 575.1, 575.3, 575.4, 455/347, 348, 349, 566; 379/433.01, 433.04, 379/433.05, 433.11, 433.12, 433.13, 434; D14/137, 138
See application file for complete search history.

(56) References Cited

U.S. PATENT DOCUMENTS

| | | | | |
|---|---|---|---|---|
| 5,818,924 A * | 10/1998 | King et al. | ............ | 379/433.13 |
| 6,798,882 B2 * | 9/2004 | Kupiainen | ............ | 379/433.04 |
| 6,983,175 B2 * | 1/2006 | Kwon | ...................... | 455/575.1 |
| 7,158,817 B2 * | 1/2007 | Kubo | ...................... | 455/575.3 |
| 7,272,411 B2 * | 9/2007 | Griffin et al. | ............ | 455/550.1 |

* cited by examiner

*Primary Examiner*—Quochien B. Vuong
(74) *Attorney, Agent, or Firm*—Rabin & Berdo, PC

(57) ABSTRACT

A mobile communication device has a main body, a display unit, an input unit. The display unit is pivotally connected with the body unit by a joint, which is located on a rim of the display unit. The input unit has a lower input module and an upper input module. The lower input module is disposed on the main body. The upper input module is pivotally connected with the lower input module by a joint, located on a rim of both the upper input module and the lower input module.

2 Claims, 5 Drawing Sheets

MOBILE COMMUNICATION DEVICE

RELATED APPLICATIONS

The present application is based on, and claims priority from, Taiwan Application Serial Number 94200795, filed Jan. 14, 2005, the disclosure of which is hereby incorporated by reference herein in its entirety.

BACKGROUND

1. Field of Invention

The present invention relates to a mobile communication device. More particularly, the present invention relates to a mobile communication device with multiple input modules.

2. Description of Related Art

A mobile phone has become an essential tool for every personal daily life. Because of advanced technology, a mobile phone's functionality increases very fast. For instance, a mobile phone can transmit short messages, video messages, and audio messages, in addition to voice communications.

A conventional mobile phone device only has an operation unit (or keyboard) of 10-20 keys for manual input. Because this operation unit is designed for executing voice communications, it is not convenient for inputting many letters or symbols.

SUMMARY

It is therefore an objective of the present invention to provide a mobile communication device with multiple input modules.

In accordance with the foregoing and other objectives of the present invention, a mobile communication device is provided. The mobile communication device includes a main body, a display unit and an input unit. The display unit is pivotally connected with the main body by a joint, which is located on a rim of the display unit. The display unit further includes a display panel and an operation module. The display panel is positioned on the display unit to output information. The operation module is positioned adjacent to the display panel for manual input.

The input unit includes a lower input module and an upper input module. The lower input module is disposed on the main body. The upper input module is pivotally connected with the lower input module by a joint, which is located on a rim of both the lower input module and the upper input module.

The lower input module has a first letter input component. The upper input module has a second letter input component on one side and a number input component on the opposite side.

When a first mode, in which only numbers can be input into the mobile communication device, is desired, the display unit fully covers the main body and the upper input module fully covers the lower input module. Thus, the number input component and the display panel are on the same side of the mobile communication device.

When a second mode, in which letters and numbers can be input into the mobile communication device, is desired, the display unit is rotated until the display unit is perpendicular to the main body. The upper input module is then rotated upside down so that the first letter input component and the second letter input component together form a keyboard.

Thus, a letter input unit is integrated into a limited space of the mobile communication device for resolving the inconvenience of inputting letters and symbols by conventional phone keyboard.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1B:
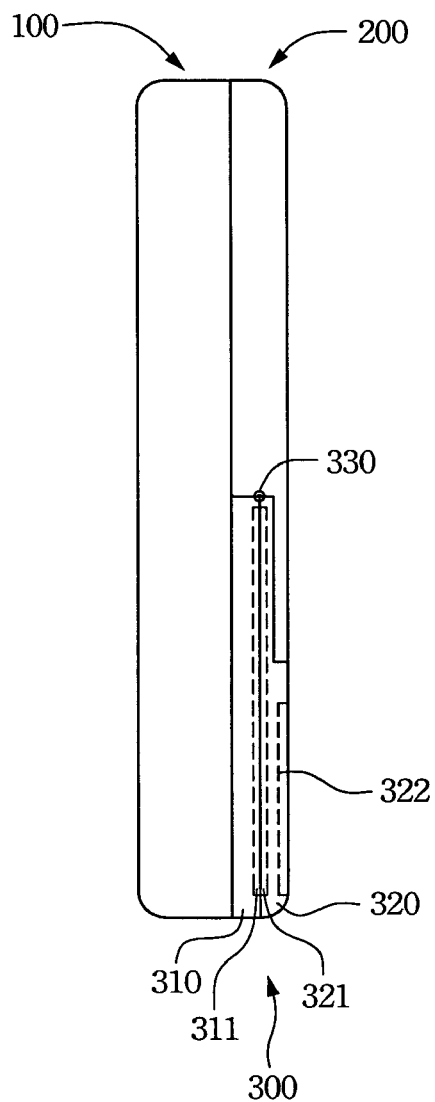
FIG. 1B illustrates a side view of a mobile device in FIG. 1A.

Reference will now be made in detail to the present preferred embodiments of the invention, examples of which are illustrated in the accompanying drawings. Wherever possible, the same reference numbers are used in the drawings and the description to refer to the same or like parts.

Figure 1A:
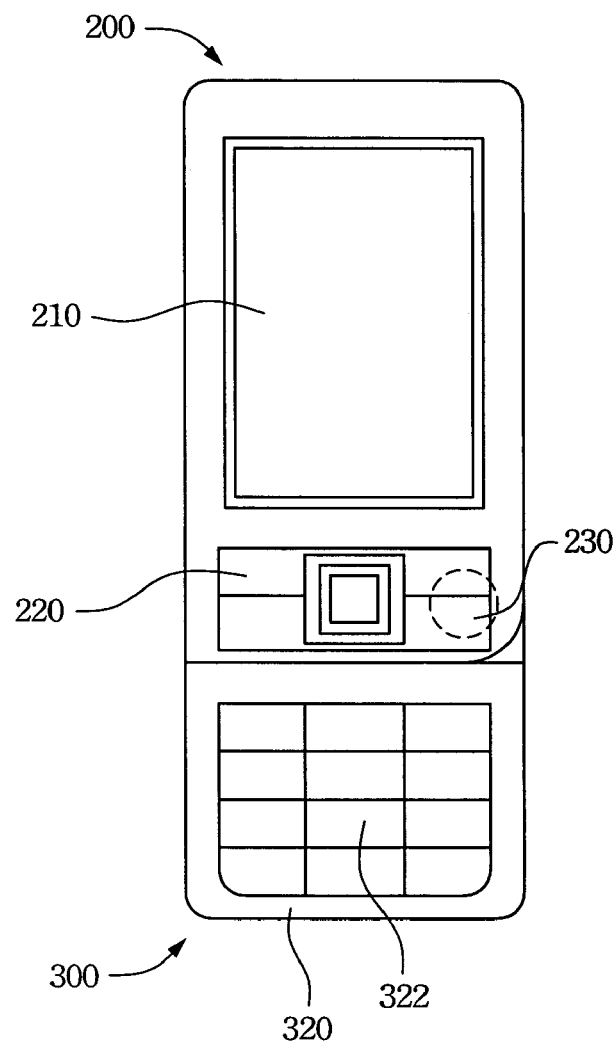
FIG. 1A illustrates a top view of a mobile device of a first mode according to one preferred embodiment of this invention.

FIGS. 1A and 1B respectively illustrate a top view and a side view of a mobile device according to one preferred embodiment of this invention. The mobile communication device includes a main body 100, a display unit 200 and an input unit 300. The display unit 200 is pivotally connected with the main body 100 by a joint 230, which is located on a rim of the display unit 200. The display unit 200 further includes a display panel 210 and an operation module 220. The display panel 210 is positioned on the display unit 200 to output information. The operation module 220 is positioned adjacent to the display panel 210 for manual input.

The input unit 300 includes a lower input module 310 and an upper input module 320. The lower input module 310 is disposed on the main body 100. The upper input module 320 is pivotally connected with the lower input module 310 by a joint 330, which is located on a rim of both the lower input module 310 and the upper input module 320.

The lower input module 310 has a first letter input component 311. The upper input module 320 has a second letter input component 321 on one side and a number input component 322 on the opposite side.

When a first mode—only numbers can be input into the mobile communication device—is desired, the display unit 200 fully covers the main body 100 and the upper input module 320 fully covers the lower input module 310. Thus, the number input component 322 and the display panel 210 are on the same side of the mobile communication device. The first letter input component 311 and the second letter input component 321 are hidden between the lower input module 310 and the upper input module 320.

Figure 2:
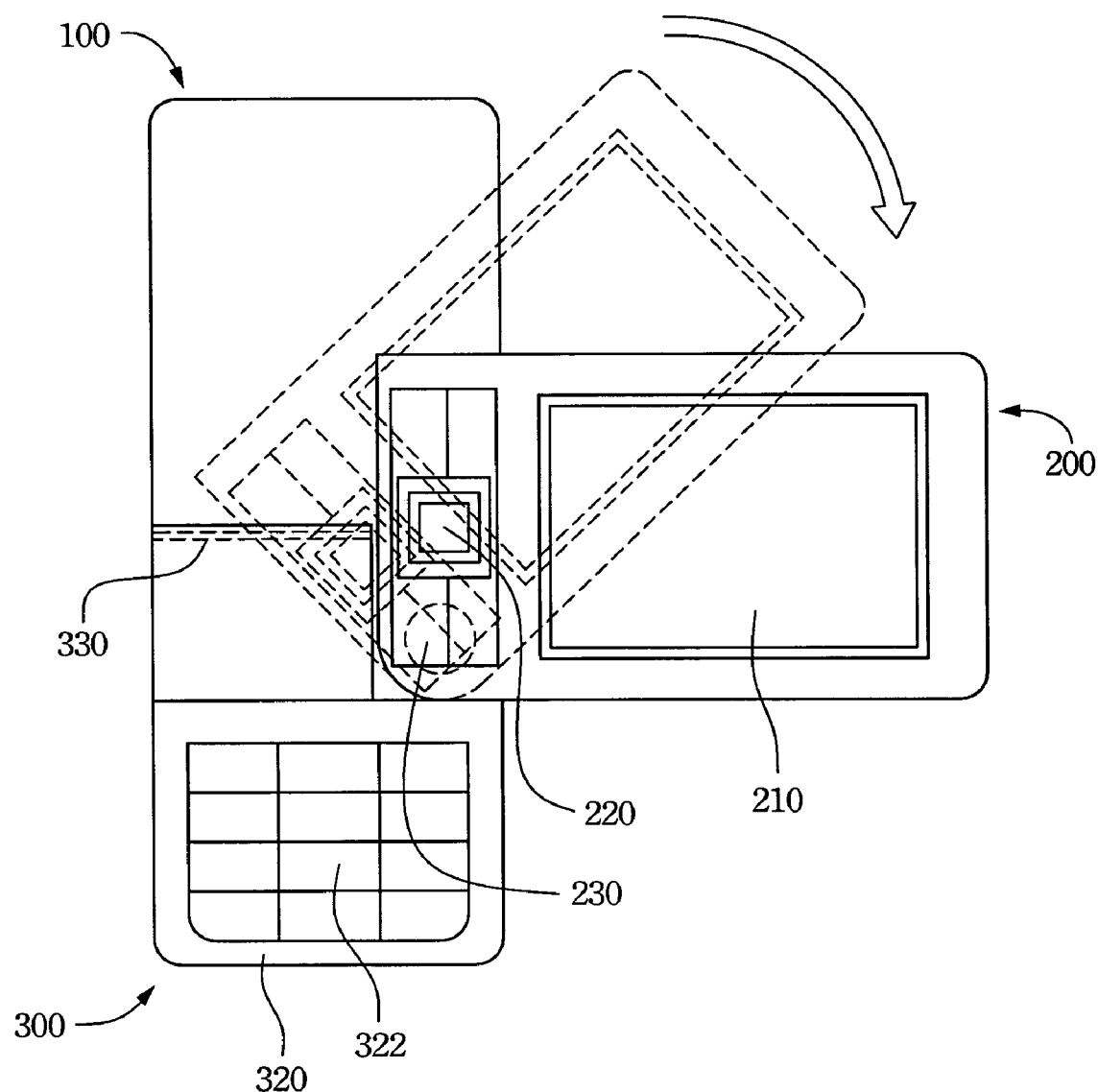
FIG. 2 illustrates a perspective view of a mobile device, wherein a display unit is rotated.
Figure 3A:
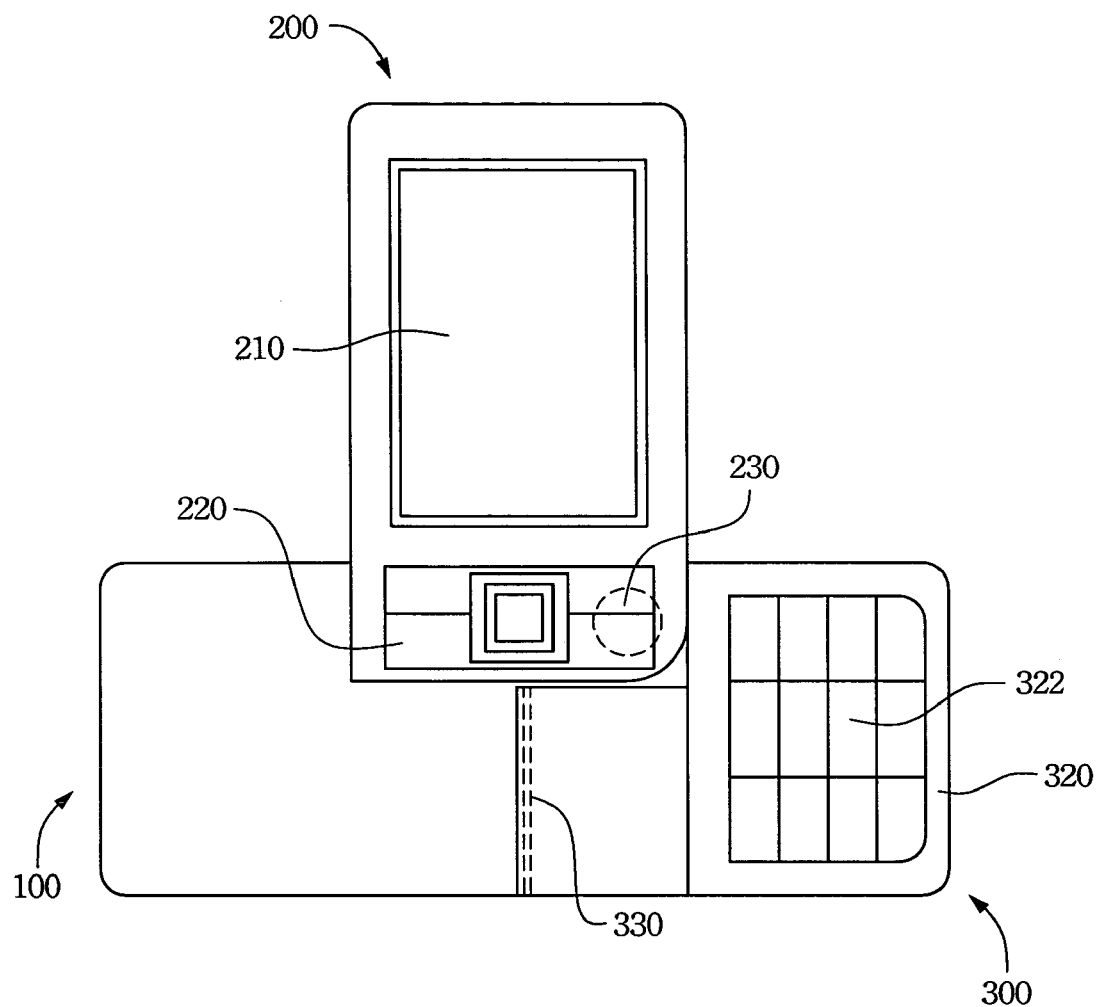
FIG. 3A illustrates a perspective view of a mobile device, wherein the display unit is perpendicular to its main body.
Figure 3B:
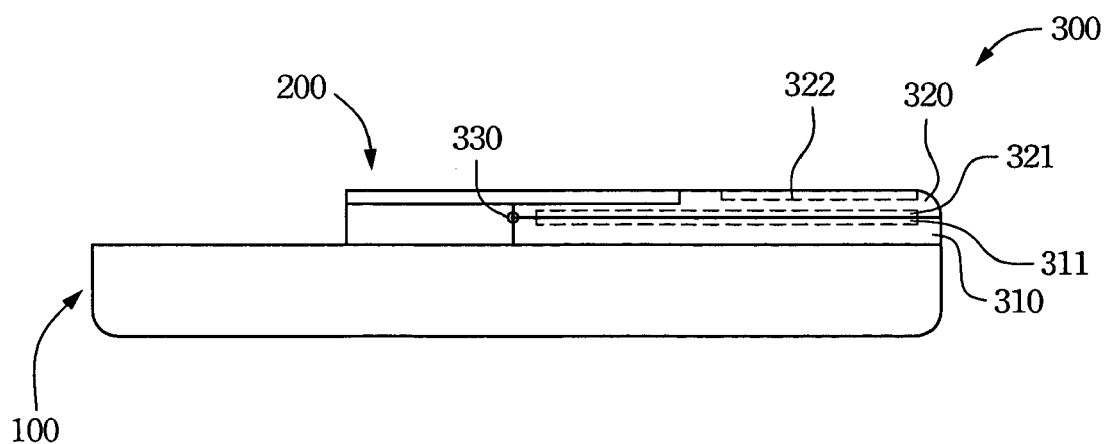
FIG. 3B illustrates a side view of a mobile device in FIG. 3A.

When a second mode, in which letters and numbers can be input into the mobile communication device, is desired (illustrated in FIG. 2), the display unit 200 is rotated until the display unit 200 is perpendicular to the main body 100 (illustrated in FIG. 3A). FIG. 3B illustrates a side view of a mobile device in FIG. 3A.

Figure 4A:
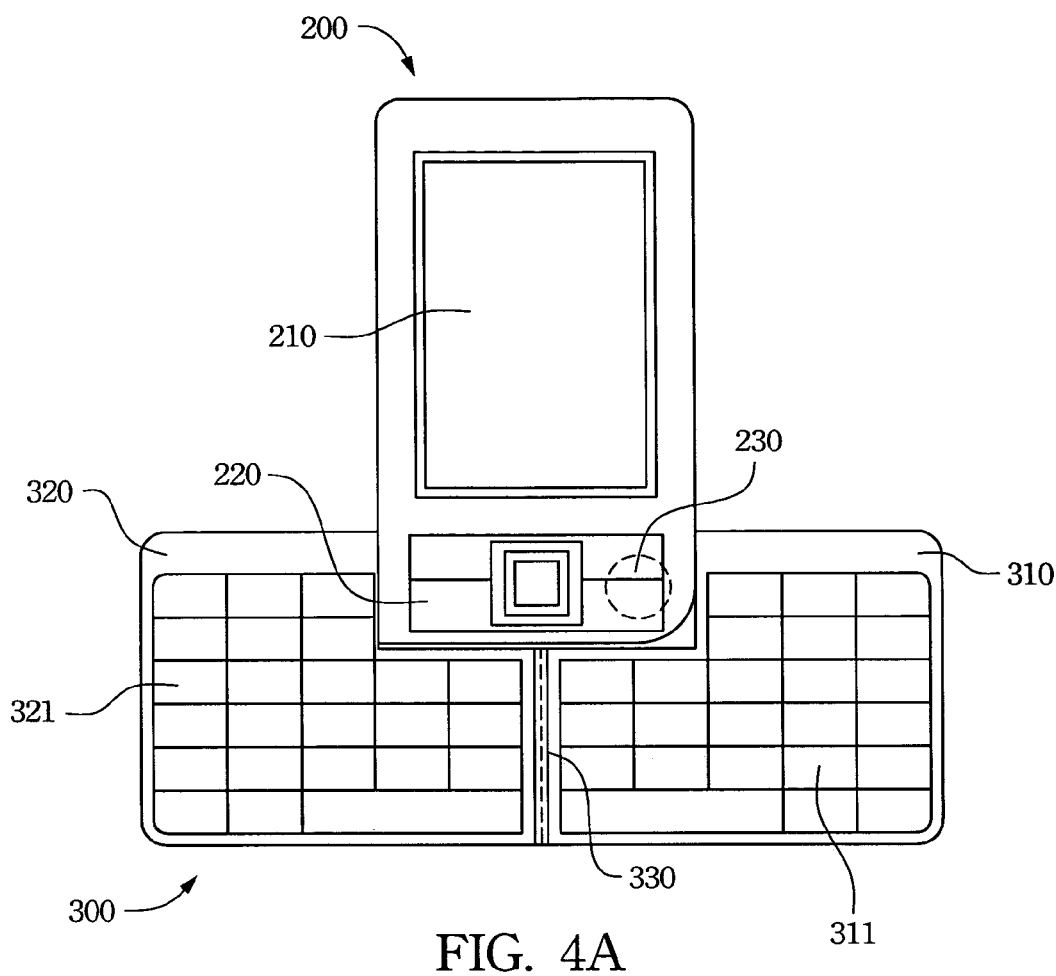
FIG. 4A illustrates a perspective view of a mobile device of a second mode.
Figure 4B:
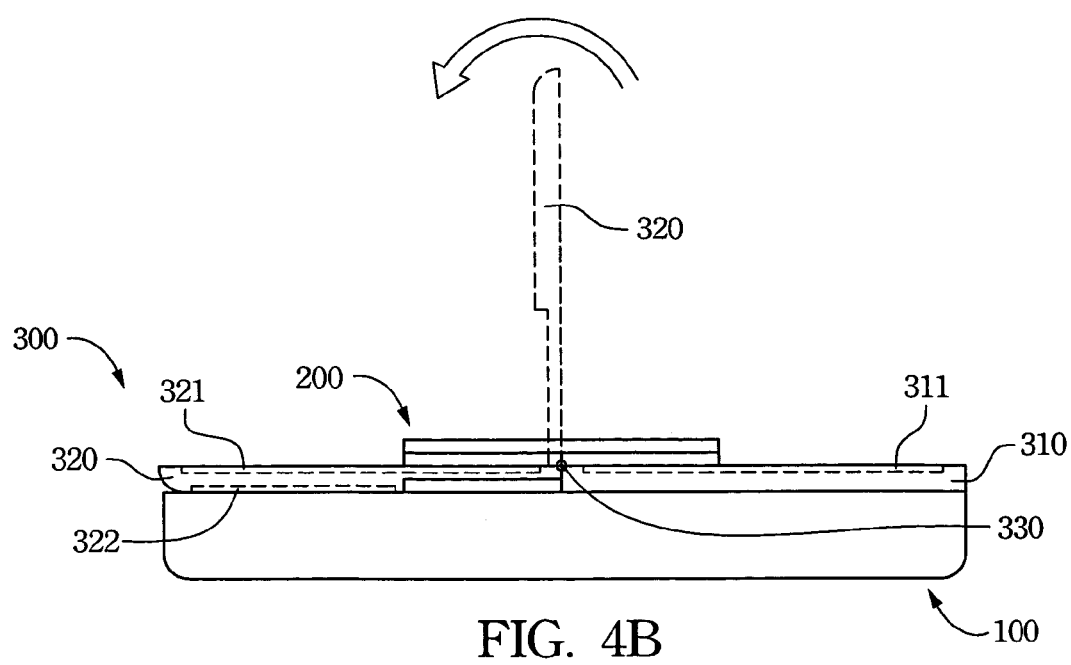
FIG. 4B illustrates a side view of a mobile device, wherein an upper input module is being rotated.

The upper input module 320 is then rotated (illustrated in FIG. 4B) until the upper input module 320, itself, is upside down. Thus, the first letter input component 311 and the second letter input component 321 can be positioned on the same side of the main body 100 (illustrated in FIG. 4A). The first letter input component 311 and the second letter input component 321 together form a keyboard (like keyboard of a computer) so as to input Chinese, English, or other language letters and symbols.

While the upper input module 320 is being rotated, the first mode and the second mode are switched to each other automatically. The first letter input component 311 and the second letter input component 321 are combined for inputting phone numbers, searching for phone numbers, or other functions. When the first mode is desired again, the upper input module 320 is rotated in reverse so as to switch the second mode to the first mode.

Figure 5:
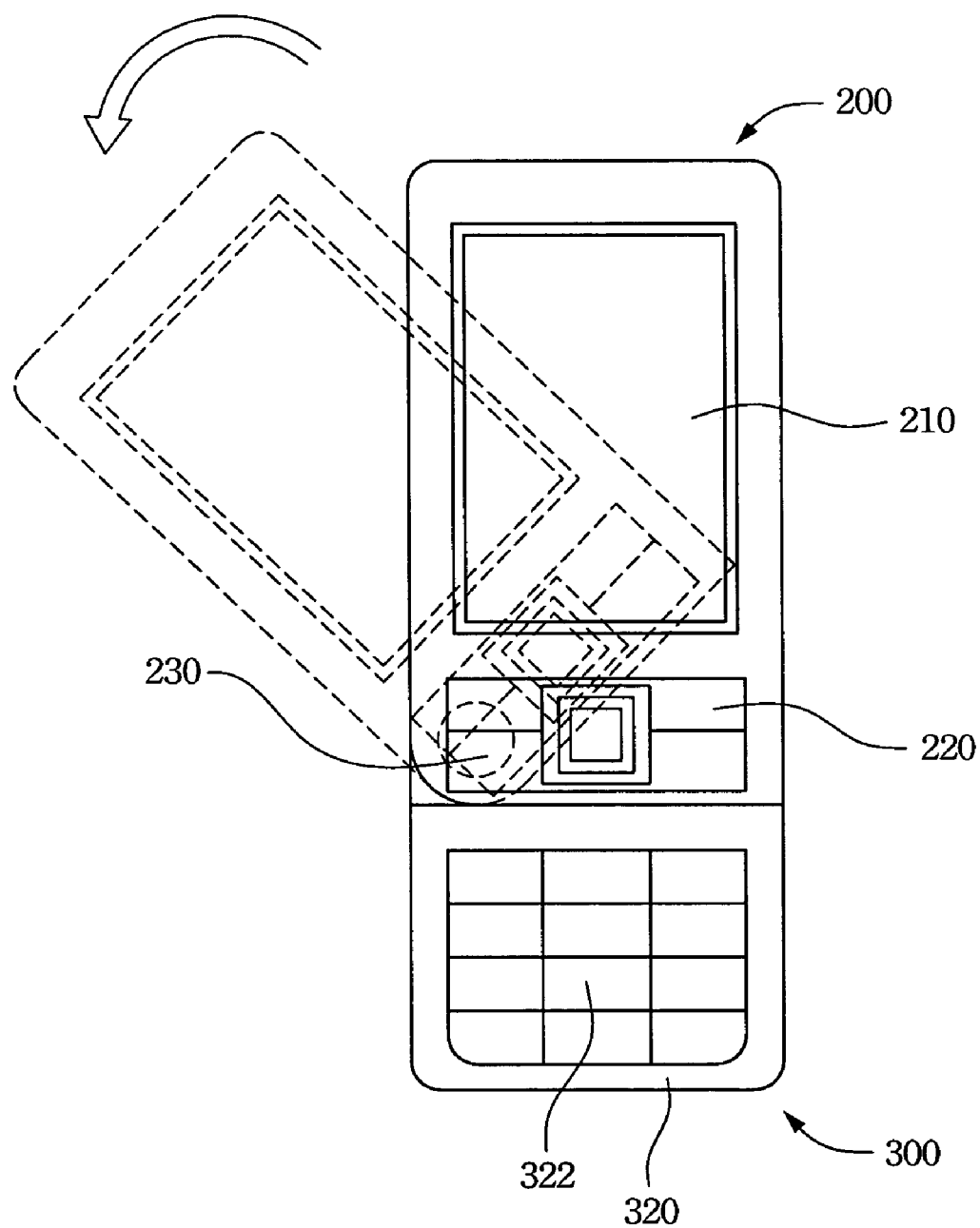
FIG. 5 illustrates a perspective view of a mobile device according to another preferred embodiment of this invention.

FIG. 5 illustrates a perspective view of a mobile device according to another preferred embodiment of this invention. The joint 230 in FIG. 5 can be located on different position from that in FIG. 2. This embodiment is also workable.

The preferred embodiments described above can also be applied in personal digital assist (PDA).

According to preferred embodiments of present invention, a letter input unit is integrated into a limited space of the mobile communication device for resolving the inconvenience of inputting letters and symbols by conventional phone keyboard.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile communication device, comprising:
   a main body;
   a display unit, pivotally connected with said main body by a first joint at a rim of said display unit; and
   an input unit, comprising:
      a lower input module, disposed upon said main body, said lower input module including a first letter input component; and
      an upper input module, pivotally connected with said lower input module by a second joint at a rim of both said lower input module and said upper input module, said upper input module comprising:
         a number input component, positioned on one side of said upper input module; and
         a second letter input component, positioned on the opposite side of said upper input module; wherein:
   when a first mode is desired, said display unit fully covers said main body, said upper input module fully covers said lower input module and said number input component is used to input data; and
   when a second mode is desired, said display unit is rotated until said display unit is perpendicular to said main body, and said upper input module is rotated upside down, whereby said second letter input component and said first letter input component are combined for inputting data.

2. The mobile communication device of claim 1, wherein said display unit comprises:
   a display panel, positioned on said display unit for outputting information; and
   an operation module, positioned adjacent to said display panel for manual operation.

* * * * *